June 26, 1951         C. A. DE GIERS         2,558,344
TANK FLOAT WITH BUMPER
Filed Dec. 22, 1945
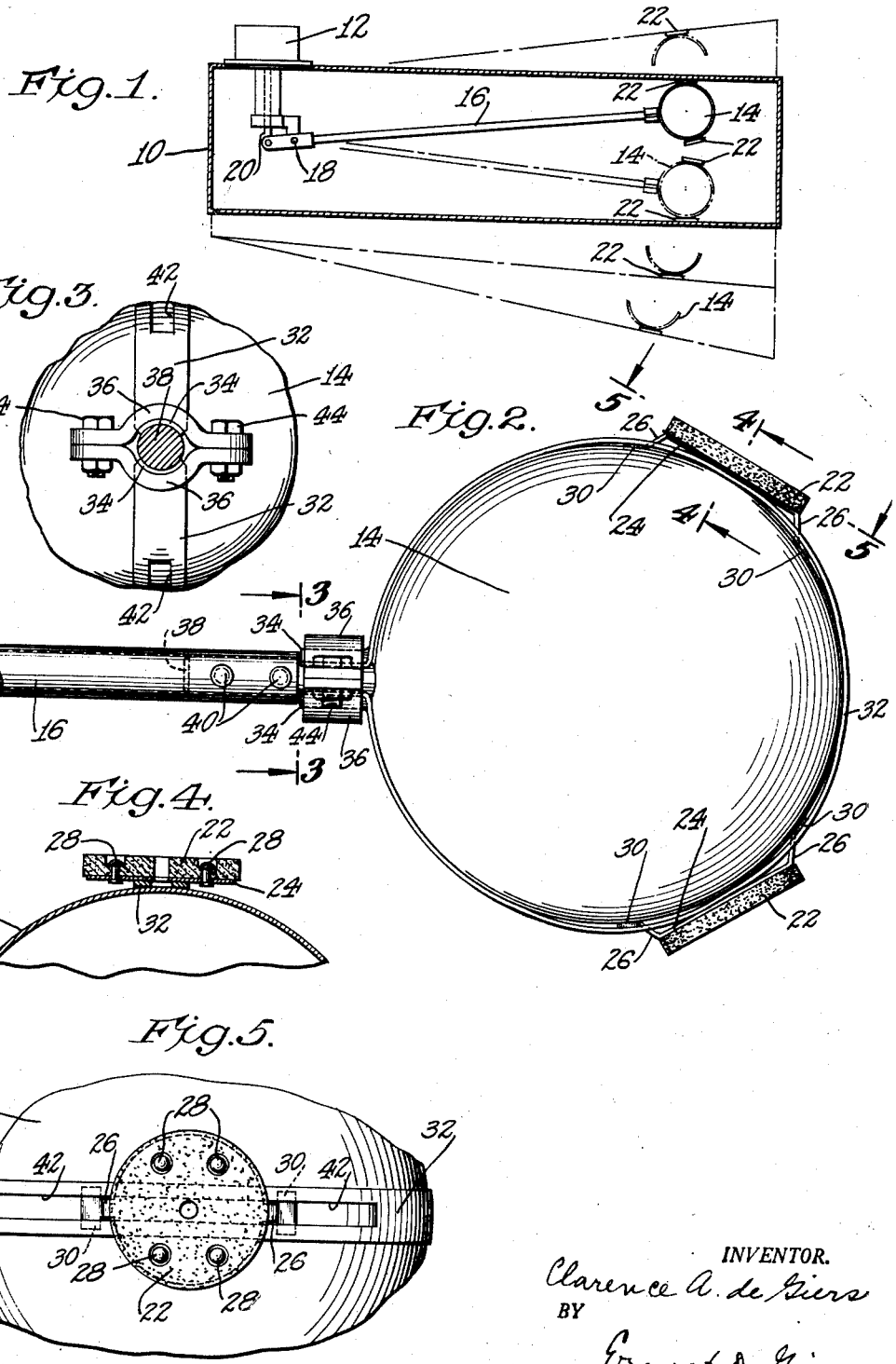
INVENTOR.
Clarence A. de Giers
BY
Ernest D. Given
ATTORNEY Patented June 26, 1951

2,558,344

UNITED STATES PATENT OFFICE 2,558,344

TANK FLOAT WITH BUMPER

Clarence A. de Giers, Forest Hills, N. Y., assignor to The Liquidometer Corporation, Long Island City, N. Y., a corporation of Delaware Application December 22, 1945, Serial No. 637,047

3 Claims. (Cl. 137—104)

This invention pertains to floats of the type used for indicating the level of liquids in tanks.

The floats are usually thin metallic spheres and it has been found in service that the metal is often injured by bumping against the tops or bottoms of the tanks, or by abrasion due to vibration of the float while in contact with a wall of a tank in a movable installation, such as a vehicle, airplane or submarine.

An object of the invention is to provide the float with bumpers for preventing contact of the float with the tank walls.

Another object is to provide means for readily moving the bumpers around the floats through a wide range of positions and for clamping them in their adjusted positions.

Another object is to provide a band around the float for attaching the float to the float arm, said band being used also for clamping the bumpers in their operative positions.

Further and other objects and advantages will be apparent from the specification and claims, and from the accompanying drawing which illustrates what is now considered to be a preferred embodiment of the invention.

The drawings show, in general, a common type of installation comprising a hollow spherical float mounted on a pivoted arm which operates an indicator to inform the operator regarding the amount of liquid in the tank.

In the drawing:

Figure 1 is a more or less diagrammatic sketch showing some necessary variations in location of the float bumpers, dependent on tank shape, length of the float arm, and point of support of the float arm;

Fig. 2 is a side view of the float arm and float with bumpers mounted on the float;

Fig. 3 is a cross-section on line 3—3 of Fig. 2;

Fig. 4 is a cross-section on line 4—4 of Fig. 2; and

Fig. 5 is a view on line 5—5 of Fig. 2.

In Fig. 1 tank 10 is provided with an indicator 12 operated by a float 14 mounted on an arm 16 fulcrumed at 18. The float rises or falls with change of liquid level and through arm 16 and rod 20, operates indicator 12 to inform the operator regarding the quantity of liquid in the tank.

The float is provided with bumpers 22 so located as to prevent the float itself from making contact with the tank top or bottom.

A preferred type of float is a hollow metal sphere, as shown at 14 in the drawings, and the bumper 22, as illustrated, is a disc of cushioning material, which may be brake lining, attached by rivets 28 to a metal plate 24 having radial extensions 26 which are broadened out to form feet 30.

The float is attached to arm 16 (Figs. 2 and 3) by a metal band 32 wrapped around the float. The ends of the band are bent in order to project radially as at 34 to be secured by a two-part bolted clamp 36 to one end of a coupling pin 38, the other end of which enters the hollow float arm 16, to be secured thereto by rivets 40.

Band 32 is slotted for much of its length as indicated at 42 (Figs. 3 and 5), and before clamp 36 is tightened, the radial extensions 26 are bent downwardly through slot 42 as shown in Fig. 2, with feet 30 underneath band 32. After the bumpers are moved circumferentially to their desired positions, clamp 36 is tightened by means of its bolts 44.

The tightening of clamp 36 serves the double purpose of clamping float 14 onto the end of the float arm 16, while at the same time locking the bumpers in their proper circumferential positions on the float.

It will be clear that the above described arrangement provides for radially attaching the float to the float arm, while simultaneously clamping bumpers at the proper points on the float circumference.

It is to be understood the invention is not limited to the specific embodiment herein illustrated and described, but may be used in other ways without departure from its spirit as described by the following claims:

What is claimed is:

1. In a liquid level indicating device, a liquid level float, a bumper comprising a disc of cushioning material attached to a supporting plate, a flexible clamping band surrounding said float, and an extension on said disc adapted to engage under said band whereby said bumper may be clamped to said float in any one of a plurality of positions.

2. In a liquid level indicating device, a liquid level float, a bumper comprising a disc of cushioning material attached to a metallic supporting plate, a slotted clamping band surrounding said float, and an extension on said disc adapted to pass through the slots in said band for clamping engagement between said band and the float.

3. In a liquid level indicating device, a liquid level float, a bumper comprising a disc of cushioning material attached to a metallic supporting plate, a slotted clamping band surrounding said float, oppositely disposed radial extensions on said plate, and laterally extending feet on said extensions adapted to pass through the slots in said bands for engagement between said band and said float.

CLARENCE A. de GIERS.

REFERENCES CITED

The following references are of record in the file of this patent:

UNITED STATES PATENTS

| Number | Name | Date |
|---|---|---|
| 419,410 | Bullard | Jan. 14, 1890 |
| 455,002 | Lonergan | June 30, 1891 |
| 459,251 | Hall | Sept. 8, 1891 |
| 920,677 | Smith | May 4, 1909 |
| 1,085,719 | Anderson | Feb. 3, 1914 |
| 1,128,105 | Cheston | Feb. 9, 1915 |
| 1,657,679 | Knudstrup | Jan. 31, 1928 |
| 2,040,986 | Gignoux | May 19, 1936 |
| 2,216,000 | Crawford | Sept. 24, 1940 |